United States Patent [19]

Gemma

[11] Patent Number: 4,910,704
[45] Date of Patent: Mar. 20, 1990

[54] TERMINAL CONTROLLER WITH BUFFER MEMORIES STORING EDITED SCREEN DATA AND CONTROL METHOD THEREFOR

[75] Inventor: Hideaki Gemma, Hadano, Japan

[73] Assignee: Hitachi, Ltd., Tokyo, Japan

[21] Appl. No.: 476,853

[22] Filed: Mar. 18, 1983

[30] Foreign Application Priority Data

Apr. 9, 1982 [JP] Japan .................................. 57-58094

[51] Int. Cl.$^4$ ............................................. G06F 9/00
[52] U.S. Cl. ................................ 364/900; 364/927.2; 364/927.7; 364/943.1
[58] Field of Search ............... 364/200, 900; 340/798, 340/703, 799

[56] References Cited

U.S. PATENT DOCUMENTS

| | | | |
|---|---|---|---|
| 4,016,545 | 4/1977 | Lipovski | 364/900 |
| 4,245,308 | 1/1981 | Hirschman et al. | 364/200 |
| 4,536,856 | 8/1985 | Hiroishi | 364/900 |
| 4,580,242 | 4/1986 | Suzuki et al. | 364/900 |

Primary Examiner—Gareth D. Shaw
Assistant Examiner—John G. Mills
Attorney, Agent, or Firm—Antonelli, Terry & Wands

[57] ABSTRACT

The invention relates to a terminal controller for editing formatted screen data sent from a processing unit to produce edited screen data and for transferring the edited screen data to a terminal device. The edited screen data which can be repeatedly used is stored in a buffer memory which is separately provided in the terminal controller. In response to a command from the processing unit, this data is extracted from the buffer memory so that the screen data is transferred to the terminal device without being re-edited for each transfer. The data stored in the buffer memory is subjected, if desired, to a synthesizing processing before it is sent to the terminal device.

9 Claims, 5 Drawing Sheets

TERMINAL CONTROLLER WITH BUFFER MEMORIES STORING EDITED SCREEN DATA AND CONTROL METHOD THEREFOR

BACKGROUND OF THE INVENTION

1. Field of the Invention

The present invention relates to a terminal controller and, more particularly, to improvements in a terminal controller which operates to buffer screen data coming from a central processing unit and for transferring this data to a terminal device.

2. Description of the Prior Art

Conventionally, when sending screen data to a terminal device, such as a display or printing device, it is usual to edit the data sent from a central processing unit by means of a terminal controller, and to transfer the edited data to a buffer memory belonging to the terminal device. The terminal controller is equipped with a screen data editing buffer memory which corresponds to the buffer memory in the terminal device and on which the screen data is edited, until the edited screen data is sent to the terminal device.

In the operations of the terminal controller thus far described, the process of editing the screen data takes the longer time because the screen data is more complex. This delays the response time from the viewpoint of the terminal device. This terminal device performs the operations of adding keyed-in data to the initial screen given from the terminal controller, and operates to send either the data of the whole screen or only the additional data to the central processing unit through the terminal controller. The above processes for an identical initial screen could sometimes be repeated, so that the terminal controller repeats the identical editing process for the identical screen data, and this raises a performance problem especially in the case of a complex initial screen. Since the central processing unit repeatedly sends the identical screen data to the terminal controller, moreover, the circuit usage is wasteful, especially when communication lines, etc., are used, thus inviting a disadvantage in the cost for the use of the communication line and so on.

SUMMARY OF THE INVENTION

It is, therefore, an object of the present invention to eliminate the above problems concomitant with prior art terminal controllers and to provide a terminal controller which has a processing performance which is improved with respect to the processings of formatted screen data whereby the transfer rate of data between a central processing unit and the terminal controller is reduced to provide the effect that the terminal controller is more cost effective for communication line use, etc.

In the present invention, the terminal controller is equipped with an edited screen data storing buffer memory, which stores screen data or the edited results of formatted screen data coming from the central processing unit, in addition to a screen data editing buffer memory in the terminal controller which corresponds to the buffer memory in the terminal device. The content of that edited screen data storing buffer memory can be transferred either as it is, or after it has been subjected to a synthesizing process, to the terminal device. The contents of that edited screen data buffer memory can be used repeatedly without need for further editing operations.

DESCRIPTION OF THE PREFERRED EMBODIMENT

The present invention will be described in detail in the following in connection with an embodiment thereof with reference to the accompanying drawings. Basically, the following processes are conducted:

(1) Both formatted screen data such as that of an initial screen and the number of a buffer memory for storing the formatted screen data are received in advance from a central processing unit, and the formatted screen data is edited and stored in a selected edited screen data storing buffer memory.

(2) In response to a command from the central processing unit, the screen data in said edited screen data storing buffer memory is sent to a terminal device.

(3) In response to a command from the central processing unit, the screen data from a plurality of edited screen data storing buffer memories are synthesized and sent to the terminal device.

(4) Both the screen data from the central processing unit and the edited screen data from one or more edited screen data storing buffer memories are synthesized and sent to the terminal device.

Figure 1:
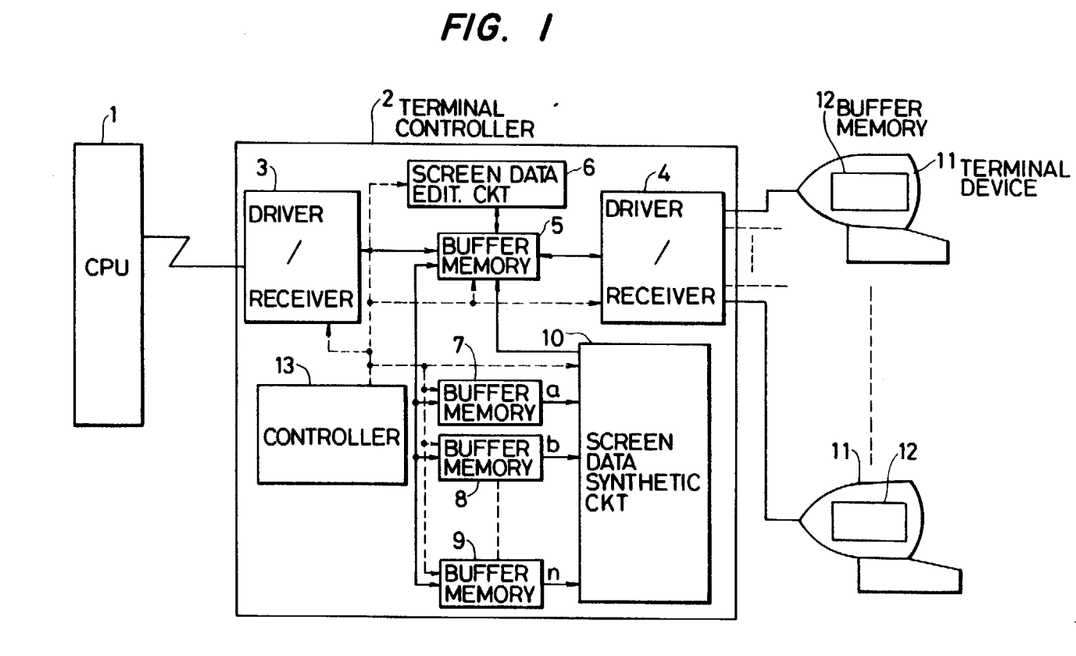
FIG. 1 is a block diagram showing a terminal controller according to one embodiment of the present invention.

FIG. 1 shows an example of the circuit construction of the terminal controller according to an embodiment of the present invention. A terminal controller 2 is interposed between a central processing unit 1 and terminal devices 11. The terminal controller 2 is equipped with a driver/receiver 3 on the central processing unit 1 side, and also with a driver/receiver 4 on the terminal devices 11 side. The terminal controller 2 is further equipped with a screen data editing buffer memory 5 which corresponds to buffer memories 12 in the terminal devices 11 and which is connected between the driver/receiver 3 and the driver/receiver 4. The screen data editing buffer memory 5 is also connected to a screen data editing circuit 6. A plurality of edited screen data storing buffer memories 7, 8 and 9 are connected directly to the screen data editing buffer memory 5. The plurality of edited screen data storing buffer memories 7, 8 and 9 are connected via a screen data synthesis circuit 10 to the screen data editing buffer memory 5. Reference numeral 13 is a program implemented controller which controls the terminal controller 2 in its entirety. The formatted screen data is, for example, that indicating the blank format in which data may be written.

Figure 2:
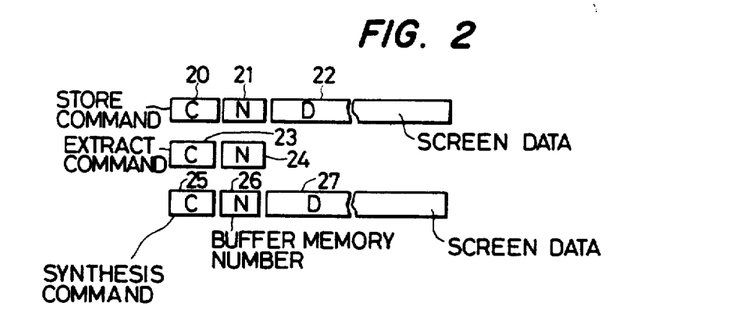
FIG. 2 is a diagram illustrating examples of the data streams which are received from a central processing unit by the terminal controller according to the embodiment of the present invention.

FIG. 2 illustrates examples of the data streams received from the central processing unit by the terminal controller according to the embodiment of the present invention. A store data stream is composed of, a store command 20; an edited screen data storing buffer memory number (e.g., a, b, - - -, n) 21, and screen data 22 to be stored. An extract data stream is composed of: an extract command 23 and a screen data storing buffer memory number 24 at which the screen data to be sent to the terminal devices is stored. A synthesis data stream is composed of: a synthesis command 25, a general screen data storing buffer memory number 26 at which the screen data to be synthesized is stored, and screen data 27 to be sent from the central processing unit 1 to the terminal devices 11.

The operations of this embodiment will now be described in detail.

(1) Storage

The central processing unit 1 stores formatted screen data having a high general usability, such as an initial screen, which is to be sent to the terminal devices 11, in the edited screen data storing buffer memories 7, 8 and 9 of the terminal controller 2. The terminal controller 2, which has received the store data stream (i.e., the store command 20, the edited screen data storing buffer memory number 21, and the screen data 22) from the central processing unit 1 through the driver/receiver 3, stores the screen data 22 temporarily in the screen data editing buffer memory 5. This screen data 22 is subjected to screen data editing processing by the screen data editing circuit 6, and the screen data thus edited is stored in the edited screen data storing buffer memory which is selected in accordance with the screen data storing buffer memory number 21. If the fixed screen data storing buffer memory number 21 is "a", for example, the edited screen data storing buffer memory selected is the buffer memory 7. Incidentally, when the terminal controller 2 receives a store command 20, it sends no screen data to the terminal devices 11.

(2) Extraction

When the terminal controller 2 receives an extract data stream (i.e., the extract command 23 and the edited screen data storing buffer memory number 24) from the central processing unit 1, it extracts the screen data from one of the edited screen data storing buffer memories 7, 8 and 9, which is selected in accordance with the screen data storing buffer memory number 24, and sends the extracted screen data via the screen data editing buffer memory 5 and the driver/receiver 4 to the buffer memories 12 in the terminal devices 11.

(3) Synthesis

When the terminal controller 2 receives a synthesis data stream (i.e., the synthesis command 25, the screen data storing buffer memory number 26 and the screen data 27) from the central processing unit 1 through the driver/receiver 3, it stores the screen data 27 temporarily in the screen data editing buffer memory 5. This screen data 27 is subjected to screen data editing processing by the screen data editing circuit 6. After this editing, the screen data synthesis circuit 10 extracts the screen data from one of the edited screen data storing buffer memories 7, 8 and 9, which is selected in accordance with the screen data storing buffer memory number 26, and synthesizes the extracted screen data with the screen data in the screen data editing buffer memory 5 until it sends out the synthesized screen data via the driver/receiver 4 to the buffer memories 12 in the terminal devices 11. Incidentally, if a plurality of screen data storing buffer memory numbers are designated in the synthesis data stream, the screen data synthesis circuit 10 synthesizes the screen data from the screen data editing buffer memory 5 and the screen data from the selected edited screen data storing buffer memories 7, 8 and 9 in sequence. On the other hand, if only a plurality of screen data storing buffer memory numbers but no screen data 27 are designated in the synthesis data stream, the screen data synthesis circuit 10 sequentially synthesizes only the screen data in the edited screen data storing buffer memories 7, 8 and 9 selected and the screen data editing buffer memory 5, and sends the synthesized screen data to the buffer memories 12 in the terminal devices 11.

Incidentally, in the terminal controller 2 thus far described, the division of each of the processes into storage, extraction, and synthesis need not rely on commands (e.g., the store command 20, the extract command 23 or the synthesis command 25), but could depend on the data stream accompanying a common command (e.g., a write command).

Figure 3:
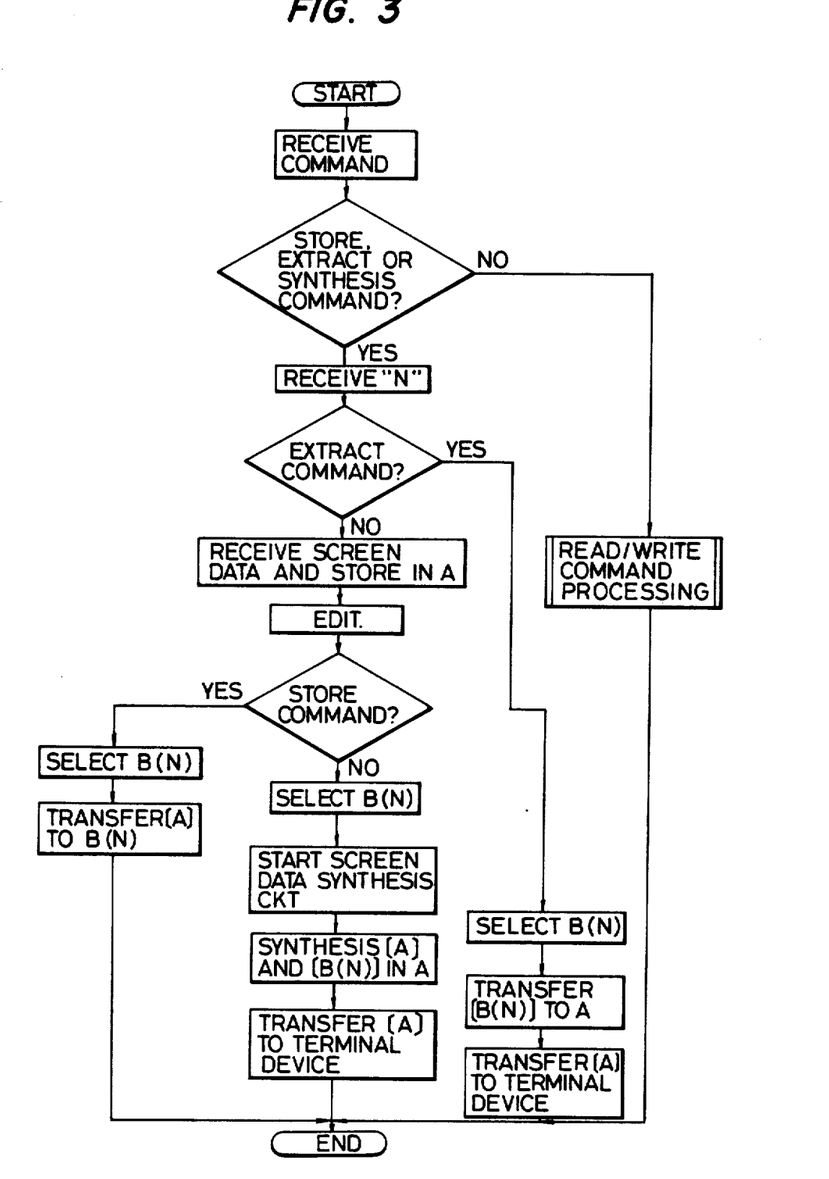
FIG. 3 is a flow chart illustrating the processing procedures of the terminal controller according to the embodiment of the present invention.

FIG. 3 illustrates the processing procedures of the terminal controller, which are executed by the controller 13 of FIG. 1. The processing procedures of FIG. 3 correspond to the case in which each of the operations of storage, extraction and synthesis are divided in accordance with commands, as shown in FIG. 2. Those processing procedures also correspond to the case in which one of the edited screen data storing buffer memories 7, 8 and 9 is selected by the synthesis data stream. In FIG. 3, the letter A designates the screen data editing buffer memory 5, and the letter B(N) designates the edited screen data storing buffer memory in which the buffer memory number is designated by the letter N. The brackets [ ] designate the contents of this buffer memory, i.e., the screen data.

In the processings conducted in FIG. 3, the data of the buffer selected in accordance with a command is transferred to the buffer memory 5 and is sent to the terminal devices, if the command is an extract command. Otherwise, the data sent is subjected to editing processing. For the store command, the edited result is stored in the buffer selected. If it is not a store command (i.e., if it is a synthesis command), the buffer data selected and the data edited are synthesized, and the synthesized data is transferred to the terminal devices. If the command is not one of these commands, the editing buffer memory 5 is subjected to a read/write processing. Thus, the processings of FIG. 3 are ended.

All of those processings are written in accordance with a program.

Next, the screen data in the screen data editing buffer memory 5 by the screen data synthesis circuit 10 and the screen data in an edited screen data storing buffer memory (e.g., 7) are synthesized by such a method as will be described in detail below.

Figure 4:
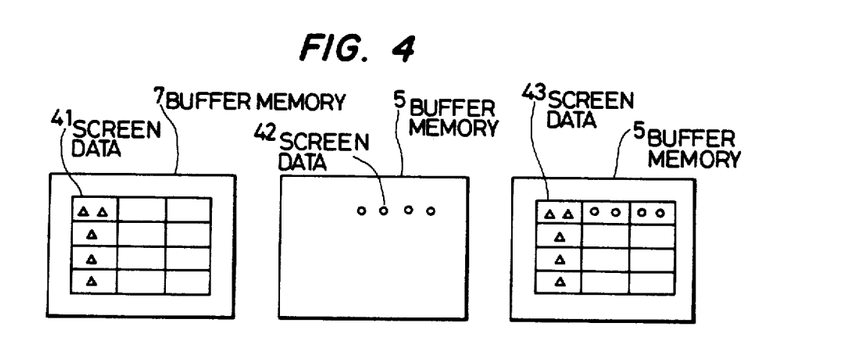
FIG. 4 is a diagram illustrating an example of the synthesis of screen data.

FIG. 4 illustrates an example of the synthesis of screen data, in which the parts identified by identical reference numerals are identical to those of the above embodiment (as shown in FIG. 1). When the screen data 41 (having been subjected to editing processing), which is stored in advance in the edited screen data storing buffer memory 7, and the screen data 42 (having been subjected to editing processing by the screen data editing circuit 6), which comes from the central processing unit and is in the screen data editing buffer memory 5, are synthesized by the screen data synthesis circuit 10, the screen data thus synthesized is sent to and displayed on the terminal devices 11.

In the synthesis of screen data, the terminal controller 2 has a construction which is slightly different according to whether the terminal devices 11 have field attributes or character attributes. The descriptions below refer to field attribute processing and character attribute processing in that order.

Figure 5:
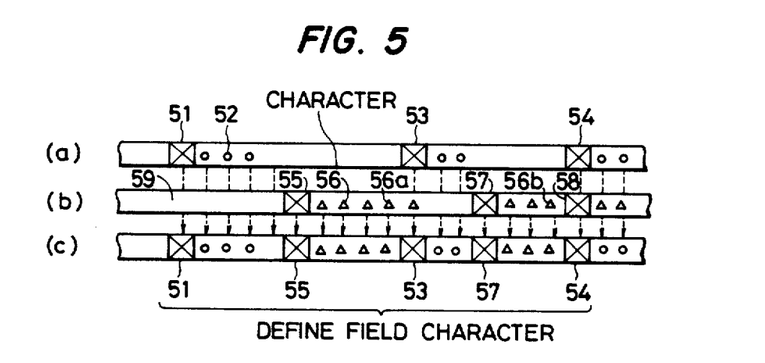
FIG. 5 is a diagram illustrating an example of the synthesis of screen data having field attributes.

FIG. 5 illustrates an example of the synthesis of screen data having field attributes. The field is defined as a group of serial characters and is the minimum unit of data handled in the program and by the terminal devices. Therefore, one field is composed of a leading DFC (i.e., Define the Field Character), which defines the type of the field, and field data of several subsequent characters. A field continues from one DFC to the next DFC, and this DFC occupies one character (not indicated) in a terminal device. In FIG. 5, the portion (a) is a portion of screen data that comes from the central processing unit 1 and is stored in the screen data editing buffer memory 5; the portion (b) is a portion of screen data that is stored in an edited screen data storing buffer memory (e.g., 7); and the portion (c) is screen data synthesized from the above portions (a) and (b), which is stored in the screen data editing buffer memory 5. When screen data is to be synthesized, it is necessary to give priority to either of the screen data because the fields and the DFCs overlap. In FIG. 5, portion (a) is an example of screen data with priority. The screen data synthesis circuit 10 of FIG. 1 synthesizes the field defined by a DFC 51 and an undefined field 59. Since, in this case, the defined field has priority over the undefined field, DFC 51 and the subsequent characters 52 are the screen data after the synthesis. Next, if a DFC 55 and subsequent characters 56 occur in portion (b), the screen data synthesis circuit 10 provides DFC 55 and the subsequent characters 56 as the screen data after the synthesis. Again in portion (a), however, if a DFC 53 and a field defined by it occur, DFC 53 is used as the screen data after the synthesis. The screen data synthesis circuit 10 give priority to DFC 54 of portion (a) and the field defined by it when it detects DFC 54 and DFC 58 simultaneously.

Figure 6:
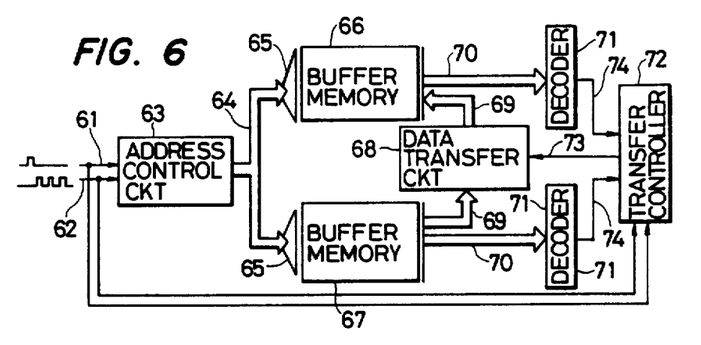
FIG. 6 is a block diagram showing a screen data (with field attributes) synthesis circuit of the terminal controller according to the embodiment of the present invention.

FIG. 6 is a block diagram showing the screen data synthesis circuit 10 of the terminal controller according to the embodiment of the present invention. In FIG. 6, a buffer memory 66 corresponds to the buffer memory 5 of FIG. 1, and a buffer memory 67 corresponds to a selected one of the buffer memories 7, 8 and 9 of FIG. 1. Both a buffer memory 66 for storing screen data with priority and a buffer memory 67 storing non-priority screen data are connected through address decoders 65 and an address bus 64 to an address control circuit 63. The address control circuit 63 is supplied with an external reset signal 61 and a clock 62. The reset signal 61 and clock 62 are also supplied to a transfer controller 72. DFC detecting decoders 71 are connected via data buses 70 to the buffer memories 66 and 67. The DFC detecting decoders 71 are also connected via DFC detection signal lines 74 to a transfer controller 72. A data transfer circuit 68 is connected via transfer buses 69 to the buffer memories 66 and 67 and via a transfer command signal line 73 to the transfer controller 72.

The operations of the above embodiment of the present invention will be described in the following.

The address control circuit 63 responds to the reset signal 61 to make the addresses for the buffer memories 66 and 67, which are stored therein, indicate the head of the screen (i.e., the head of the memory), and then responds to the clock 62 to increment the address by one character (a DFC is also handled as one character). In accorance with this address, data is read out from the buffer memories 66 and 67. When a DFC detecting decoder 71 detects a DFC, it notifies the transfer controller 72 of this by a DFC detection signal 74. The transfer controller 72 returns to its initial state in response to the reset signal 61 and then synchronizes with the clock 62 to start the data transfer circuit 68 by the transfer command signal on line 73 in response to the two DFC detection signals on lines 74. The starting condition is satisfied when a DFC is detected by the buffer memory 67. These starting operations are repeated in synchronism with the clock 62 until a DFC is detected by the buffer memory 66. In the example of screen data of FIG. 5, the transfer controller 72 starts the data transfer circuit 68 for both the screen data from DFC 55 to a character 56a, and the screen data from DFC 57 to a character 56b. When it receives a start command, the data transfer circuit 68 transfers the data of one character from the buffer memory 67 to that location in the buffer memory 66 which is indicated by the address control circuit 63. Incidentally, the transfer buses 69 may be made common with the data buses 70.

Figure 7:
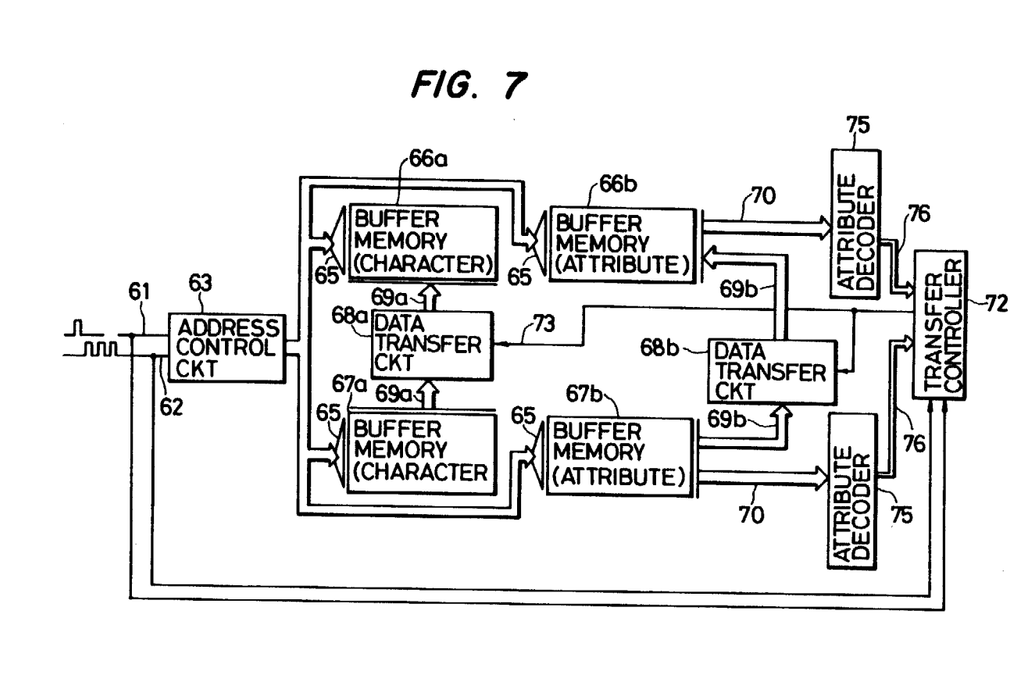
FIG. 7 is a block diagram showing a screen data (with character attributes) synthesis circuit.

FIG. 7 is a block diagram of the screen data synthesis circuit 10 of a terminal controller which executes character attributing processing. In FIG. 7, the parts identified by identical numerals are identical to those of the above embodiment. The buffer memories (i.e. the buffer memory 12, the screen data editing buffer memory 5, and the edited screen data storing buffer memories 7, 8 and 9 of FIG. 1) of the terminal devices and the terminal controller, which execute the character attribute processing, are composed of character buffers storing characters and attribute buffers storing the corresponding character attributes. (The number of bits in the character buffers for one character need not always be identical to the number of bits in the attribute buffers.)

In FIG. 7, the characters are transferred from a character buffer memory 67a to a character buffer memory 66a by the action of a data transfer circuit 68a. Similarly, the attributes are transfered from an attribute buffer memory 67b to an attribute buffer memory 66b by the action of a data transfer circuit 68b. The propriety of these transfers is judged by the transfer controller 72 after the contents of the attribute buffer memories 66b and 67b are decoded by attribute decoders 75. Thus, the priority of the attributes (i.e., whether or not the screen data is to be synthesized) can be set as required by the actions of the attribute decoders 75 and the transfer controller 72.

Figure 8:
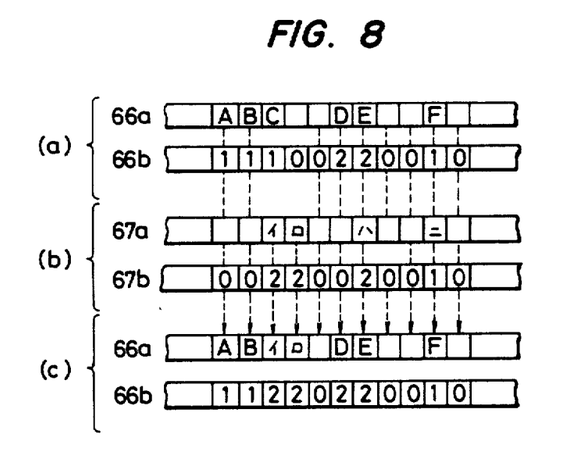
FIG. 8 is a diagram illustrating an example of the synthesis of screen data having character attributes.

FIG. 8 illustrates an example of the synthesis of screen data having character attributes. In FIG. 8, the portion (a) is a portion of screen data that is stored in the screen data editing buffer memory 5 (and 66a and 66b); the portion (b) is a portion of screen data that is stored in the edited screen data storing buffer memories (67a and 67b); and the portion (c) is screen data synthesized from the above portions (a) and (b), which is stored in the screen data editing buffer memory 5 (and 66a and 66b). The synthesis example of FIG. 8 is very simple, the attributes are of three kinds (i.e., 0, 1 and 2), and the attribute having the larger values has priority. When attributes are identical, on the other hand, the contents of the screen data editing buffer memory 5 (and 66a and 66b) has priority.

With the constructions thus far described, the present invention can enjoy the following effects:

1. Since the formatted screen data to be sent to the terminal devices is edited and stored in advance, it does not need to be edited again. As a result, the time required for the processing of the terminal controller is reduced so that the response time from the point of view of the terminal devices is improved. The present invention is effective for the initial screen display, etc., of on-line processing, this effect is more noticeable for a more complex screen.
2. Since only the formatted part of the display screen is divided, edited, and stored in advance, its screen data does not need to be edited again, but the time required for the processing of the terminal controller is reduced to improve its performance.
3. The data transfer between the central processing unit and the terminal controller is reduced to improve the performance. When circuits, etc., are used, moreover, their wasteful use is eliminated to invite an advantage in cost.

What is claimed is:

1. A terminal controller for receiving screen data sent from a processing unit, for editing said screen data, and for transferring the edited data to a terminal device having a screen data buffer memory in response to selected commands from said processing unit, comprising:
   first buffer memory means for storing formatted screen data received from said processing unit in a non-display form;
   editing means connected to said first buffer memory means for editing formatted screen data received from said first buffer memory means to produce edited screen data in a display form;
   second buffer memory means for storing edited screen data; and
   control means for transferring the edited screen data from said editing means to said second buffer memory in response to a first command from said processing unit and for transferring said edited screen data in said second buffer memory to the screen data buffer memory in said terminal device in response to a second command from said processing unit.

2. A terminal controller according to claim 1, which further comprises synthesis means for synthesizing edited screen data in said first buffer memory means with edited screen data in said second buffer memory means to form synthesized edited screen data, and wherein said control means operates to enable said editing means and said synthesis means to respond to a third command from said processing unit for transferring the synthesized edited screen data from said synthesis means to said terminal device.

3. A terminal controller according to claim 1, wherein said second buffer memory means includes a plurality of said second buffer memories, said first and second commands being accompanied by selection data that designates one of said second buffer memories, and said control means operates to transfer said screen data from and to the designated second buffer memory in response to the selection data that accompanies said first and second commands, respectively.

4. A terminal controller according to claim 3, wherein said third command is accompanied by selection data which designates one of said second buffer memories, said terminal controller further comprising synthesis means for synthesizing said edited screen data in said first buffer memory means with edited screen data in the second buffer memory designated by said selection data to form synthesized edited screen data, and wherein said control means operates to enable said editing means and said synthesis means to respond to said third command for transferring the synthesized screen data from said synthesis means to said terminal device.

5. A terminal controller according to claim 2, wherein said edited screen data has one or more fields each of which includes a control character to define the attribute of the field and field data that follows said control character, and said synthesis means includes means for synthesizing edited screen data in said first buffer memory means with edited screen data in said second buffer memory means by giving priority to said control character in said first buffer memory means over the field data in said second buffer memory means and to the screen data in said first buffer memory means over the screen data in said second buffer memory means.

6. A terminal controller according to claim 2, wherein said edited screen data includes one or more data elements to be output and data assigned to each of the elements of the data to indicate priority for said synthesis, and said synthesis means includes means for selecting one element based upon said priority data assigned to the elements at the same position of said two edited screen data that are to be synthesized.

7. A terminal controller according to claim 4, wherein said edited screen data has one or more fields each of which includes a control character to define the attribute of the field and field data that follows said control character, and said synthesis means includes means for synthesizing edited screen data in said first buffer memory means with edited screen data in said second buffer memory means by giving priority to said control character in said first buffer memory means over the field data in said second buffer memory means and to the screen data in said first buffer memory means over the screen data in said second buffer memory means.

8. A terminal controller according to claim 6, wherein said synthesis means includes:
   third buffer memory means for storing the edited data from said first buffer memory means; fourth buffer memory means for storing data indicating the priority of the data in said third buffer memory means; fifth memory means for storing the edited data from said second buffer memory means; sixth buffer memory means for storing data indicating the priority of the data in said fifth buffer memory means;
   first means for reading out sequentially and comparing the data elements which are stored at identical positions in said fourth and said sixth buffer memory means; and
   second means responsive to the result of the comparison by said first means for writing a pre-selected one of the data elements of said third and said fifth buffer memory means into one of said third and said fifth buffer memory means to form said synthesized edited screen data.

9. A method for controlling a terminal controller which includes a first buffer memory and a second buffer memory, means for editing screen data sent from a processing unit, and means for controlling the transfer of edited data to a screen data buffer memory in a terminal device, comprising the steps of:

receiving formatted screen data in a non-display form from said processing unit in said first buffer memory;

editing the formatted screen data using said editing means to produce edited screen data in a display form and storing the edited screen data in said first buffer memory;

storing said edited screen data into said second buffer memory in reponse to a first command from the processing unit; and selectively transferring the edited screen data stored in said second buffer memory, either as it is or after being subjected to processing, to the screen data buffer memory in said terminal device in response to a second command from said processing unit.

* * * * *